April 15, 1941.                L. W. REINHARDT                2,238,341
                               MORTISING EQUIPMENT
                            Filed Aug. 30, 1939              2 Sheets-Sheet 1
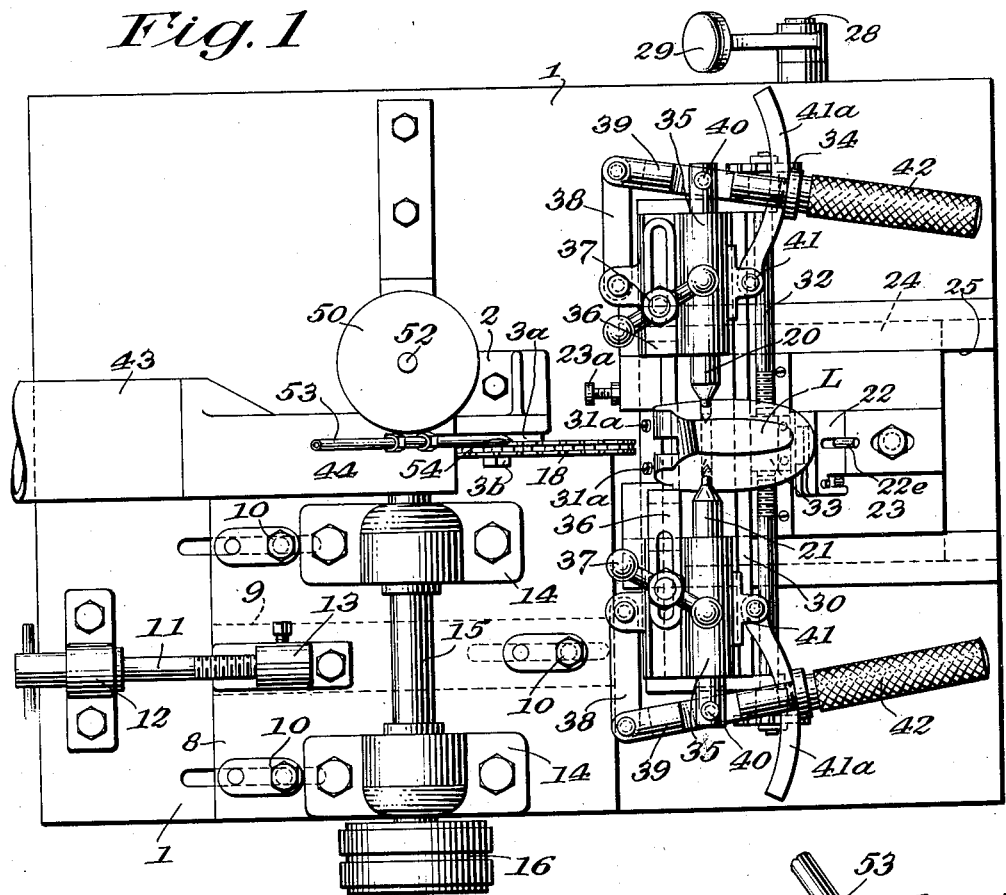
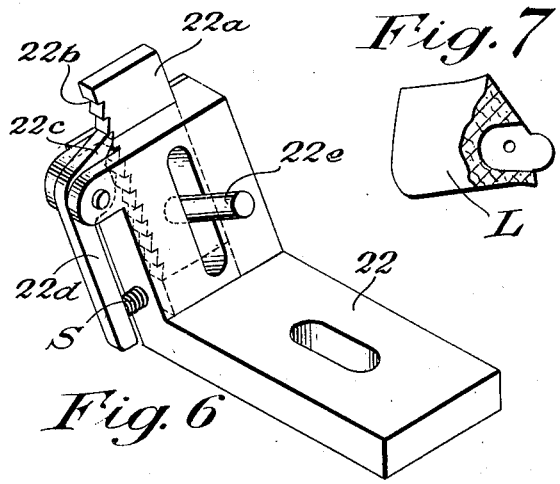
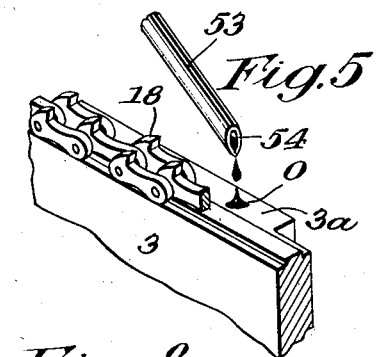
INVENTOR.
Louis W. Reinhardt
BY Spear, Rawlings & Spear
ATTORNEYS.

April 15, 1941.  L. W. REINHARDT  2,238,341
MORTISING EQUIPMENT
Filed Aug. 30, 1939   2 Sheets-Sheet 2
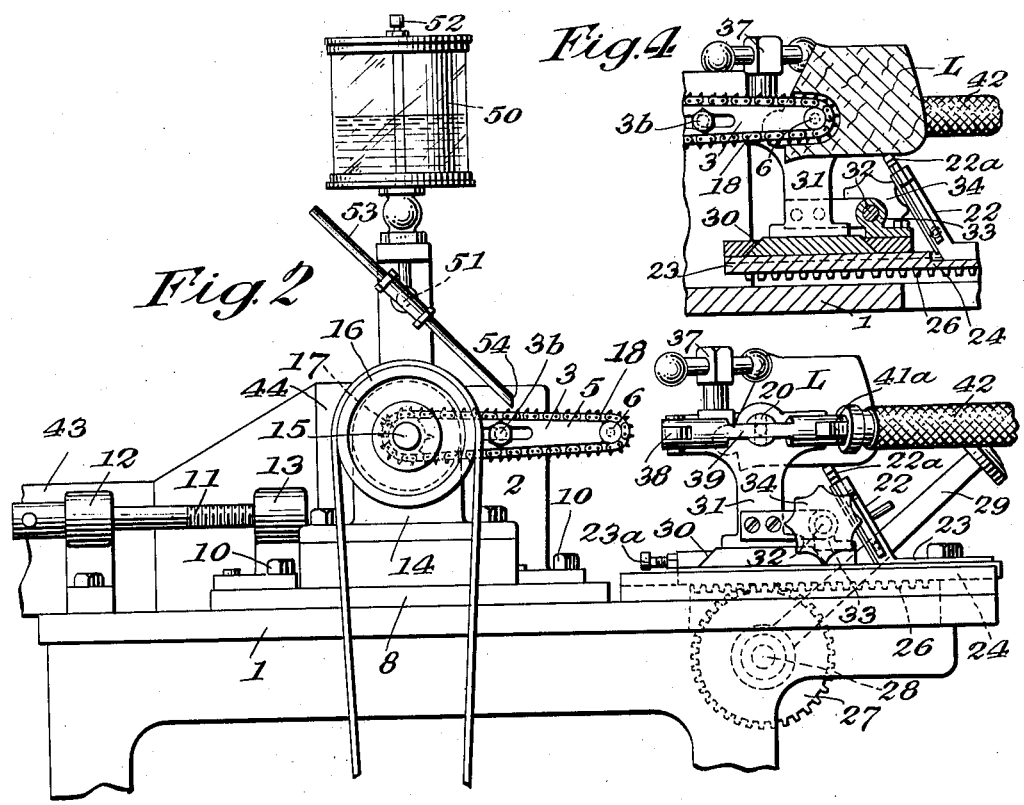
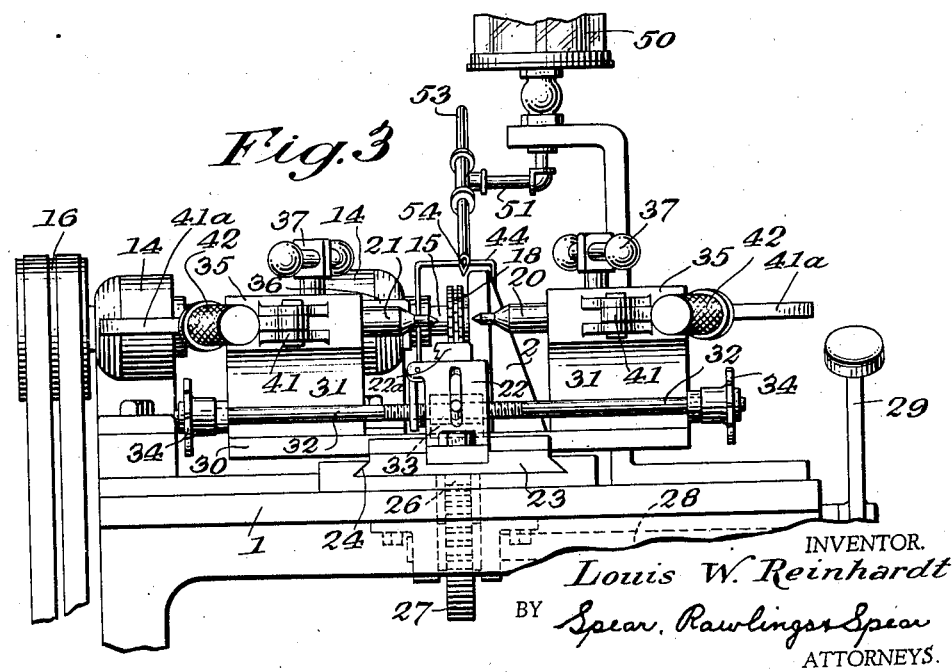
INVENTOR.
Louis W. Reinhardt
BY Spear, Rawlings Spear
ATTORNEYS.

Patented Apr. 15, 1941

2,238,341

UNITED STATES PATENT OFFICE 2,238,341

MORTISING EQUIPMENT

Louis W. Reinhardt, Brockton, Mass., assignor to Belcher Hinge Corporation, Stoughton, Mass., a corporation of Massachusetts Application August 30, 1939, Serial No. 292,569

5 Claims. (Cl. 144—72)

My present invention relates to novel mortising apparatus. While mortisers have many different uses, the various problems are so well illustrated in the mortising of the fore and heel parts of lasts to receive the link by which such parts are hingedly connected, that I have confined the discussion of my invention to that particular use.

Mortisers of the type with which I am concerned consist of a cutting chain supported by a driving sprocket and an anti-friction roller carried by a bar rigidly mounted on the frame. A work support is also employed and in the manufacture of lasts such a work support includes adjustable centering and positioning means normally mounted on the frame to permit the operator to carry the work into and out of contact with the cutting chain.

Because the cutting chain travels at high speeds, the proper lubrication of the anti-friction roller is of the utmost importance since the chain and the anti-friction roller are expensive, and, prior to my invention were frequently requiring repairs and replacement, thus limiting the economy and efficiency of their use.

In accordance with my invention, I provide for the lubrication of the anti-friction roller in a novel manner. It should be kept in mind that in mortising the bearing enters within the last part and that a suction stream is always employed to scavenge the sawdust from the apparatus, making it difficult to lubricate adequately the anti-friction roller.

To overcome these difficulties, I deliver a regulated flow of lubricant onto the bar carrying the bearing laterally of the chain and protected from the influence of the exhaust stream. Assisted by the pull of the rapidly traveling cutting chain, the oil flows under the chain to the bearing. From the bottom of the bearing, the pull of the chain and the exhaust thereon carry away excess oil. While some oil gets on the chain and its teeth, with a properly regulated flow of lubricant, the last parts are never damaged. I have found that in accordance with my invention, breakage of or damage to the chain and the bearing are virtually eliminated.

In accordance with my invention, many other novel features are provided. Among these may be mentioned my novel means for adjusting the tension of the cutting chain and my novel centering and adjusting means by which right and left last parts and lasts of different sizes may be handled with greatly increased speed and accuracy.

In the drawings I have illustrated a typical mortising apparatus in accordance with my invention in which its several novel features and advantages will be apparent. In the drawings:

Fig. 1 is a plan view of apparatus in accordance with my invention.

Fig. 2 shows the apparatus of Fig. 1 in side view.

Fig. 3 is a front view of the apparatus shown in Fig. 1.

Fig. 4 is a fragmentary sectional view showing the device in use.

Fig. 5 is a fragmentary view in perspective of the cutting chain and oiling system.

Fig. 6 is an enlarged view of the adjustable height support, and

Figs. 7 and 8 are partly sectioned views of completed last parts.

In accordance with my invention, I employ a base 1 that may be a frame, table, or the like. The base 1 includes a support 2 to which is rigidly attached the bar 3 of a conventional mortiser. The bar 3 may be tapered as shown in Figs. 2 and 4, or it may be formed as shown in Fig. 5 so that its top surface is horizontal. The bar 3 presents a work penetrating portion 5 forwardly of the support 2 and supports at its front end an anti-friction roller 6 preferably of the type having roller bearings which may be lubricated through the bar 3 adjacent the roller 6. Rearwardly of the work penetrating portions 5, the bar 3 includes a portion 3a spacing the bar 3 from the support 2 and through which the supporting bolts 3b pass, by which the bar 3 is rigidly fastened to the support 2.

At 8 I have indicated a plate slidably splined as at 9 to the base 1 and provided with locking means 10 by which the plate 8 may be rigidly locked in any adjusted position. Adjustments of the plate 8 are effected by means of the screw 11 extending through the boss 12 on the base 1 and threaded through the fixed nut 13 on the plate 8.

The plate 8 carries bearings 14 for the shaft 15 carrying a pulley 16 adapted to be connected in any suitable manner to a driving mechanism (not shown). The shaft 15 also carries the driving sprocket 17. The cutting chain 18 is supported by the sprocket 17 and the roller 6. It has been the practice to adjust the tension of the chain 18 by moving the bar 3 relative to its support 2, but in accordance with my invention, adjustment of the chain tension is effected by moving the sprocket 17 by adjusting the position of the plate 8. This permits greater accuracy in adjustments and the plate 8 may be firmly anchored to maintain the adjusted tension during use.

For work centering and supporting means, I have shown mechanism for use in mortising last parts, one of which is indicated at L. The centering mechanism includes the centering pins 20—21 adapted to enter the pin holes in the last parts by which the hinges or links are anchored in place. The adjustable support by means of which the height of the centered work is controlled is indicated generally by the reference numeral 22.

At 23 I have indicated a movable support slidably mounted on the base 1 as by the key portion 24 in the slot 25 in the base 1. The portion 24 is formed with teeth to establish a rack 26 in mesh with a gear 27 on the shaft 28 carried by the base 1 and rotated by the handle 29 to carry the support 23 towards or away from the cutting chain 18. A bolt 23a serves to limit movement of the support 23 towards the cutting chain 18 by contact with the support 2.

The support 23 carries the support 22 and is formed as at 30 to slidably receive the mount 31. A rod 32, rotatably carried by the mount 31 is threaded through a fixed nut 33 on the support 23 and is provided with heads 34 by rotation of which the mounts 31 may be accurately centered in relation to the chain 18. Stops 31a on the support 23 limit the lateral movement of the mount 31 to prevent the pins 20 and 21 from being positioned so that they might be brought into contact with the chain 18.

The mount 31 carries identical means to adjust each of the centering pins 20 and 21. The pins 20 and 21 are each mounted in sleeves 35 carried by the mount 31. Stops 36 are slidably carried on the mount 31 and may be locked in any adjusted position by the clamps 37. To the back of the mounts 31, I pivotally mount links 38 to which are pivotally connected the lever arms 39 pivotally connected as at 40 to the pins 20 and 21. The front of the frames 41 supports arcuate locking guide bars 41a in support of the lever arms 39. Handles 42 are threaded on the lever arms 39 and may be advanced to interlock with the bars 41a when desired to hold the lever arms against movement.

The adjustable support 22 is formed to receive the slide 22a having ratchet teeth 22b engaged by the pawl 22c under the influence of the spring S and carried by the lever 22d on the support 22. The support 22 is slotted for the handle 22e by which the slide 22a is manually raised. When the slide 22a is to be lowered the lever 22d is manually actuated to disengage the pawl 22c from the ratchet 22b. Such a support is extremely convenient in use as it permits the proper heights of the centered work to be quickly and accurately established.

In the use of the centering mechanism just described, it is customary to position the last part L with the pins 20 and 21 in the pin holes. By moving the last part L by means of both lever arms 39, it may be centered accurately with reference to the chain 18. If further adjustment is necessary, the mount 31 may be moved by turning the head 34 on the roll 32. For changes in size, as well as changes from fore to heel parts, adjustments of the support 22 and of the frame 36 are necessary.

After the last part L is accurately centered, one of the lever arms 39 is locked and the handle 29 turned to carry the last part L against the chain 18.

After the last part L has been mortised, it may be removed and replaced by a like last part by moving the unanchored lever arm 39. When like last parts are to be mortised, one of the stops 36 is adjusted to serve as an accurate limit of the penetration of the pins 20 or 21 in the pin holes of the last part L. With changes in size, from fore to heel parts, and from right to left last parts, the necessary adjustments may be quickly effected for accurate centering.

Rearwardly of the base 1, I have indicated an exhaust 43 adapted to be connected to any suitable source of suction (not shown). The mouth 44 of the exhaust 43 overlies the sprocket end of the chain 18 to scavenge all sawdust from the chain 18 and the work.

Because of the high rate of chain travel, the shaft 15 rotating at 3600 R. P. M., and the severe usage to which mortising equipment is subjected, the lubrication of the roller 6 is of great importance.

In accordance with my invention I provide a continuous regulated flow of oil to the roller 6. I mount on the base 1 an oil chamber 50 having an outlet 51 controlled by a valve 52. The outlet 51 communicates with a discharge pipe 53 angularly disposed and open at both ends. The delivery end of the pipe 53 is skived as at 54 to enter between the chain 18 and the support 2. In order to minimize the effect of the exhaust stream, the delivery end 54 is disposed to deliver oil as far forwardly on the portion 3a as possible. Oil flows from the portion 3a to the tapered part 5 of the bar 3 towards the roller 6 in which direction it is materially aided by the pull of the chain. From the roller 6 the oil is drawn to the exhaust 43 by the suction and the pull of the chain. Thus while an adequate supply of oil to the roller is maintained, oil on the chain 18 is kept at a minimum so that the work is not noticeably affected thereby. The adequate lubrication ensures the long life of the relatively expensive chain and roller and ensures the efficient and economical use of mortising equipment in accordance with my invention.

What I therefore claim and desire to secure by Letters Patent is:

1. Mortising apparatus comprising a support, a driving sprocket and a bar mounted on said support, an anti-friction roller carried by said bar, a cutting chain carried by said sprocket and said roller establishing a mortiser having a work penetrative portion, an exhaust conduit adapted to be operatively connected to a source of suction to scavenge sawdust and the like from said chain and said support, and means to deliver a continuous flow of a lubricant to said roller, said lubricating means comprising an oil source, a delivery conduit including an oil discharge and means to regulate the flow of oil to said discharge, said oil discharge being disposed to deliver oil to said bar laterally of said chain at a point adjacent the rear end of said work penetrative portion to be relatively uninfluenced by the suction in exhaust conduit, so that the delivered oil is carried along said bar under said chain to said roller by the pull of said chain and away from said roller by the pull of said chain.

2. Mortising apparatus comprising a support, a driving sprocket and a bar mounted on said support, an anti-friction roller carried by said bar, a cutting chain carried by said sprocket and said roller establishing a mortiser having a work penetrative portion, an exhaust conduit adapted to be operatively connected to a source of suction to scavenge sawdust and the like from said chain and said support, and means to deliver a continuous flow of lubricant to said roller, said lubricating means comprising an oil source including a valve controlled outlet, a delivery conduit connected to said outlet and having an air intake and an oil discharge, said discharge being disposed to deliver oil to said bar laterally of said chain at a point adjacent the rear end of said work penetrative portion to be relatively uninfluenced by the suction in exhaust conduit, so that the delivered oil is carried along said bar under said chain to said roller by the pull of said chain and away from said roller by the pull of said chain.

3. Mortising apparatus comprising a support, a driving sprocket and a bar mounted on said support, an anti-friction roller carried by said bar at its small end, a cutting chain carried by said sprocket and said roller establishing a mortiser having a work penetrative portion, said bar including a portion in contact with said support to space said chain from said support, an exhaust conduit adapted to be operatively connected to a source of suction to scavenge sawdust and the like from said chain and said support, and means to deliver a continuous flow of lubricant to said roller, said lubricating means comprising an oil source including a valve controlled outlet, a delivery conduit connected to said outlet and having an air intake and an oil discharge, said oil discharge being cut away to establish a delivery point shielded from said exhaust stream and between said chain and said support and disposed to deliver oil to said bar portion at a point adjacent the rear end of said work penetrative portion to be relatively uninfluenced by the suction in said exhaust conduit so that the delivered oil flows along said tapered bar under said chain to said roller aided by the pull of said chain and away from said roller by the pull of said chain.

4. Mortising apparatus comprising a sprocket, a bar, an anti-friction roller carried by said bar, a cutting chain carried by said roller and said sprocket to establish a mortiser having its work penetrative portion inclusive of said roller, and means to deliver a gravity flow of oil to said bar laterally of said chain and rearwardly of the work penetrative portion of said mortiser, said means comprising a source of oil, an oil conductor, a valve controlled outlet effecting communication between said source and said conductor, and said oil being carried along said bar to said roller by the pull of said chain.

5. Mortising apparatus comprising a sprocket, a bar, an anti-friction roller carried by said bar, a cutting chain carried by said roller and said sprocket to establish a mortiser having its work penetrative portion inclusive of said roller, and means to deliver a gravity flow of oil to said bar laterally of said chain and rearwardly of the work penetrative portion of said mortiser, said means including a source of oil, an open-ended oil discharge tube, a valve controlled outlet from said source, said outlet being connected to said discharge tube intermediate its ends, and said oil being carried along said bar to said roller by the pull of said chain.

LOUIS W. REINHARDT.